No. 620,690. Patented Mar. 7, 1899.
L. W. YAGGY.
COIN CONTROLLED VENDING AND DISPLAY APPARATUS.
(Application filed Jan. 15, 1898.)
(No Model.) 7 Sheets—Sheet 1.

Witnesses
W. C. Coelig
Allan U. Murray

Inventor
Levi W. Yaggy,
by Coburn, Hibben & McElroy,
attys.

No. 620,690. Patented Mar. 7, 1899.
L. W. YAGGY.
COIN CONTROLLED VENDING AND DISPLAY APPARATUS.
(Application filed Jan. 15, 1898.)
(No Model.) 7 Sheets—Sheet 3.

Witnesses
W. C. Coolies
Allan A. Murray

Inventor
Levi W. Yaggy,
by Coburn, Hibben & McElroy,
attys.

No. 620,690. Patented Mar. 7, 1899.
L. W. YAGGY.
COIN CONTROLLED VENDING AND DISPLAY APPARATUS.
(Application filed Jan. 15, 1898.)
(No Model.) 7 Sheets—Sheet 4.

No. 620,690. Patented Mar. 7, 1899.
L. W. YAGGY.
COIN CONTROLLED VENDING AND DISPLAY APPARATUS.
(Application filed Jan. 15, 1898.)

(No Model.) 7 Sheets—Sheet 5.

UNITED STATES PATENT OFFICE.

LEVI W. YAGGY, OF LAKE FOREST, ILLINOIS.

COIN-CONTROLLED VENDING AND DISPLAY APPARATUS.

SPECIFICATION forming part of Letters Patent No. 620,690, dated March 7, 1899.

Application filed January 15, 1898. Serial No. 666,834. (No model.)

*To all whom it may concern:*

Be it known that I, LEVI W. YAGGY, a citizen of the United States, residing at Lake Forest, in the county of Lake and State of Illinois, have invented certain new and useful Improvements in Coin-Controlled Vending and Display Apparatus, of which the following is a specification.

My invention relates to a combined coin-controlled display and vending apparatus in which a display mechanism or some entertaining device is located in connection with the vending apparatus so that by the employment of a single coin the display and vending apparatus may both be operated, thus furnishing entertainment and refreshment for the patron.

My invention also comprises a motor-driven vending apparatus ordinarily coin-controlled, whereby no appreciable effort is required to operate the device other than the insertion of a coin.

My invention further relates to a new and useful package-delivery mechanism designed to be employed with coin-controlled vending apparatus, whereby it is possible to arrange packages very compactly in the mechanism and also to deliver them freely and without any tendency or possibility of clogging.

My invention further relates to a new and useful fraud-preventive mechanism for coin-controlled apparatus, whereby by means of a very simple mechanism I am enabled to prevent the unauthorized operation of said mechanism by light-weight coins or other foreign substances.

My invention further relates to certain specific improvements in coin-controlled apparatus generally, all of which will be specifically described, and set out in detail in the claims.

I have illustrated my invention as embodied in one form in the accompanying set of drawings, in which the same letters of reference are used to designate identical parts in all the figures, of which—

The principal mechanisms in the apparatus in which I have here shown my invention as embodied are, in the order in which they receive or are operated by the coin, the fraud-preventive mechanism, the motor mechanism, the display devices, and the package-delivery mechanism or vending apparatus.

Referring now to Figs. 1, 6, and 11 to 13, I will describe the fraud-preventive mechanism. The casing A of the complete apparatus may be of any desired shape, construction, or ornamentation except as may be set out in the details subsequently mentioned. I have shown the apparatus as arranged for two different commodities in the vending apparatus, and consequently have two slots B for the reception of the coin, preferably located in the front upper portion of the case. In connection with these slots B, I employ cards or labels C of some sort to show the article which will be delivered by inserting the coin into the adjacent slot. The coin is inserted in the slot B and passes into the rectangular aperture in the upper end of the switch mechanism D. This switch mechanism D coöperates with an upper chute E, which is designed to receive the light-weight spurious coins, and also with a tube or chute F, adjacent thereto and preferably immediately below it, which receives the correct coins. The switch D consists of the body portion G, which has in its construction a portion of a rectangular tube of a size adapted to accommodate a coin of the desired denomination. This body portion is open at both ends and may have a rectangular aperture H in its upper side. An arm J is fastened, preferably, to the upper side of the chute E and projects forward and over the aperture H and has fastened thereto by means of any suitable clamping mechanism a magnet K, which may be of the common horseshoe variety. A notch L is cut into the side of the body portion G of the switch, and into this notch L projects the downwardly and inwardly turned end M of a spring mechanism, which preferably consists of the long spring-wire N, which is fastened, as at O, to the upper side of the chute E. The body portion G of this switch is connected to the two arms P, of a bell-crank shape, which are pivotally mounted at their angles Q, preferably on the sides of the chute F. The upper ends of the substantially vertical portions of the bell-cranks are connected by a cross-piece R, which has rearwardly projecting therefrom a screw-threaded rod S, upon which is mounted the interiorly-threaded weight T. Forwardly projecting from the under side of the upper end of the chute F is a plate U. The operation of this fraud-preventive mechanism is as follows: The weight T is so adjusted as to normally hold the switch-piece in the position of Fig. 11, with its body portion forming substantially a continuation of the upper chute E. When a coin of the proper size and weight is inserted in the aperture B, it passes into the body portion G until it rests against the downwardly-turned end M of the spring-detent N. The weight of the coin is sufficient to overbalance the weight T, and the switch swings down to the position shown in dotted lines in Fig. 11, when the body portion G forms a continuation of the chute F, the plate U preventing the switch from moving too far down. As the switch moves down and just as the body portion comes in register with the chute F the coin is released from the end M of the spring-detent N, which remains stationary, and the coin is allowed to slide by its gravity down the chute F. If the coin is light weight, it will not overbalance the weight T, and it will be perceived that owing to the screw-threaded adjustment of said weight I am enabled to adjust this mechanism very carefully, so as to prevent this switch mechanism from being operated by a light-weight coin. As the switch does not move downward under the stress of a light-weight coin, when the next coin is inserted it will force the light-weight or spurious coin past the end M of the spring-detent N and into the chute E, through which it passes into a trough V, (see Fig. 3,) which terminates in the tube W, which discharges the spurious or light-weight coin upon a bell X, suitably mounted in the lower rear side of the casing, whence it falls into a box Y, intended to receive the coins, thus giving notice to the proprietor that an attempt has been made to beat the apparatus. In case an iron or other magnetic counterfeit of the coin is placed in the switch, the attraction of the magnet K will prevent it from operating the switch even if its weight be sufficient, and the switch will be held in its upper position until the magnetic counterfeit is forced out into the chute E by a succeeding coin in the same way that a light-weight coin is disposed of.

The motor mechanism and the display devices, which I will describe in connection with each other, are substantially the same as those shown in my application, Serial No. 635,357, filed May 6, 1897, for an advertising system and apparatus.

While I show the preferred form of display apparatus, it will be understood that I do not thereby limit myself to the combination of that specific display apparatus with the other mechanisms, but that when said display apparatus is considered as an element any other form of an amusement-providing mechanism may be employed.

Figure 3:
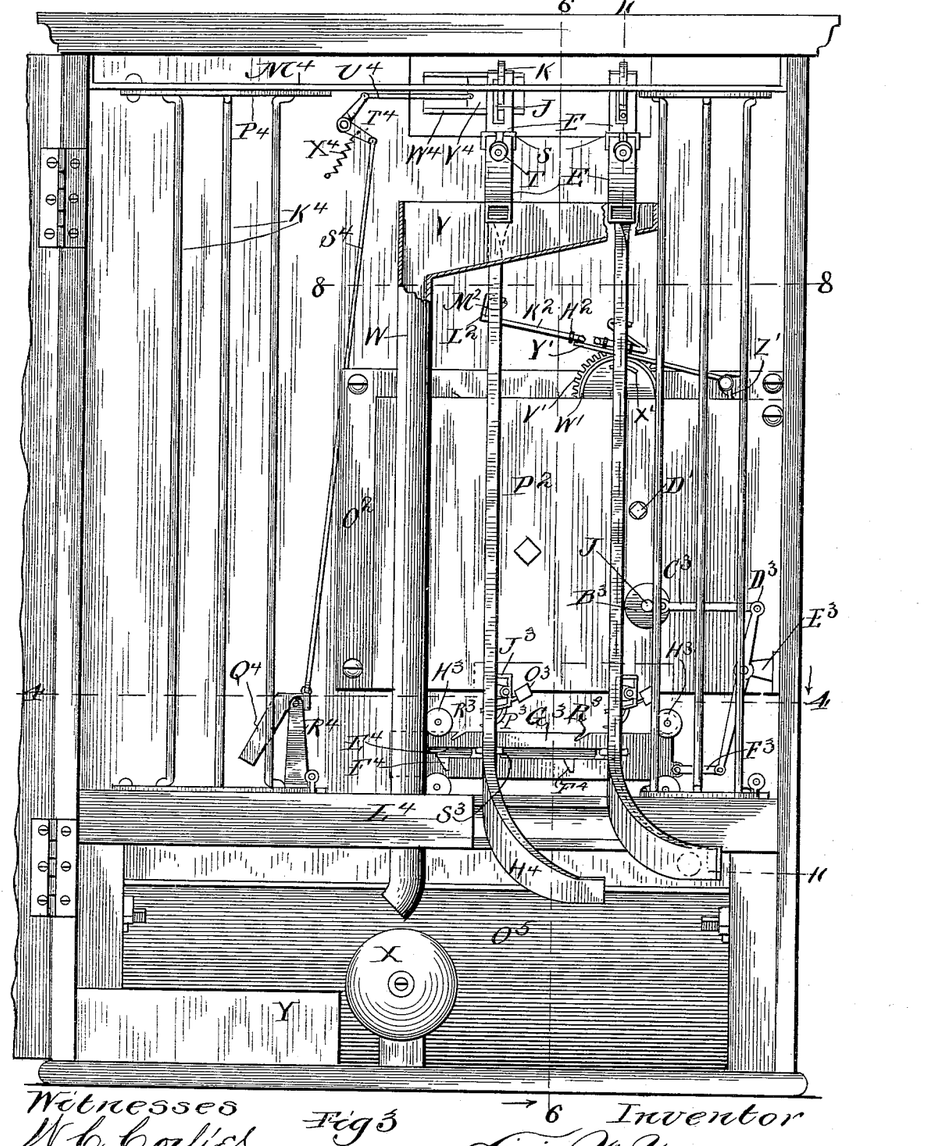
Fig. 3 is a rear elevation with the door constituting the back of the casing opened and some of the parts broken away to more clearly disclose the construction of the various parts.

Referring now to Figs. 1, 2, 6, 8, and 9, A' is a spring-barrel of any desired construction which contains a spring-motor which I employ as in some respects preferable to any other power, although it will be understood that any other form of a motor might be employed. This spring-barrel A' is furnished with the gear B', which meshes with a gear-pinion C' upon the winding-shaft D', upon which is loosely mounted the gear-wheel E', adjacent to the ratchet-wheel F'. A pair of spring-pressed pawls G', mounted upon the gear-wheel E', coöperate with the teeth of the ratchet-wheel F', so that as the winding-shaft D' is turned from the left over to the right in order to wind up the motor the gear-wheel E' is not affected, but as the shaft is unwound by the motor it carries the gear-wheel E' with it. This gear-wheel E' meshes with a gear-wheel H', rigidly mounted upon a shaft J', which is rotated to operate the vending apparatus in a manner to be subsequently described. This wheel E' further meshes with a gear-pinion K', fastened upon a shaft L', which carries the gear-wheel M', which by means of a train of intermediate gearing, including the worm-gear N', operates the shaft O', carrying the fan-wheel or flier P'. This shaft O' also carries the projection Q' for the purpose to be subsequently mentioned. This gear-wheel E' also meshes with a gear-pinion R', fastened upon the shaft S', which also has fastened thereon the notched disk T'. A train of speed-reducing gearing connects this shaft S' with the shaft U', which has mounted thereon the disk V', which carries upon its face the flange W', which is interrupted at two opposite places, and directly within these interruptions are two short supplemental flanges X'. Suitably fulcrumed is a spring-pressed lever, which consists of a substantially horizontal arm Y' and a substantially vertical arm Z'. The arm Y' has fastened thereto an arm or lug $A^2$, which projects into the plane of the flanges W' and X'. The arm Z' terminates in or has fastened thereto a lug $B^2$, which projects into the path of the lug Q' upon the fan-wheel shaft O'. The arm Z' also has two bends therein, which gives it a substantially horizontal portion $C^2$, which is in the plane of the periphery of the notched disk T' and coöperates with the oppositely-disposed notches $D^2$ therein. The tubes F are continued at their lower ends by the vertically-disposed chutes $E^2$, to be more fully described subsequently. In the upper portion of each of these tubes $E^2$ is an elongated aperture $F^2$ in its wider sides. Pivotally mounted on the back of the partition $G^2$ by means of any convenient bearings, such as the staples $H^2$, are the curved tripping rods or wires, consisting of the horizontal portions $J^2$, the ends of which project over and rest upon the outer end of the arm Y', the body portions $K^2$, which, as seen in Fig. 3, are at a considerable angle to the horizontal, and the other arm portions $L^2$, which terminate in or have connected thereto the detents $M^2$, which project into the apertures $F^2$ when they are in their uppermost position. The operation of this portion of the motor mechanism may be briefly described as follows: Supposing that the motor is wound up and that a coin has been passed through the chute F and into its perpendicular continuation $E^2$, the coin contacts with the portion $M^2$ of the tripping-rod and, bearing down thereon, causes it to rock the other end $J^2$ downward, and thereby to rock the arm Y' downward against the resistance of its spring. The train of gearing is in the position shown in Fig. 9, and as the arm Y' is rocked downward its detent end $B^2$ is rocked out of engagement with the lug Q' on the fan-wheel shaft O' and the clockwork mechanism begins to operate. The arm $A^2$ passes down through the mutilated portion of the flange W' until it rests on the adjacent flange X'. The movement of the motor mechanism turns the notched disk T' and as it rotates, its notch passing away from the horizontal or detent portion of the arm $C^2$, serves to hold the said arm, so as to prevent the reëngagement of its end $B^2$ with the lug Q' until the disk T' has made half a rotation. The flange X', being contacted by the end $M^2$ of the tripping-rod, limits the movement of the tripping-rod under the weight of the coin until the movement of the gearing carries the flange X' from beneath the arm $A^2$, when it is free to drop still farther inward, and consequently the tripping-rod can also drop farther down until its movement away from the chute $E^2$, caused by the angle at which the portion $K^2$ of the tripping-rod is set, carries the end $M^2$ out of the slot $F^2$ and permits the passage of the coin. The arm $A^2$, and consequently the lever Y' Z', is held downward by the flange W' until the opposite aperture of the flange comes into line with the arm $A^2$, during which time the disk T' has made several complete rotations and one of the notches $D^2$ is opposite the horizontal or detent portion $C^2$ of the arm Z' to permit of said arm swinging inward under stress of its spring until its end $B^2$ comes in the plane of rotation of the lug Q' upon the fan-wheel shaft O' to stop the train from further rotation.

Figure 1:
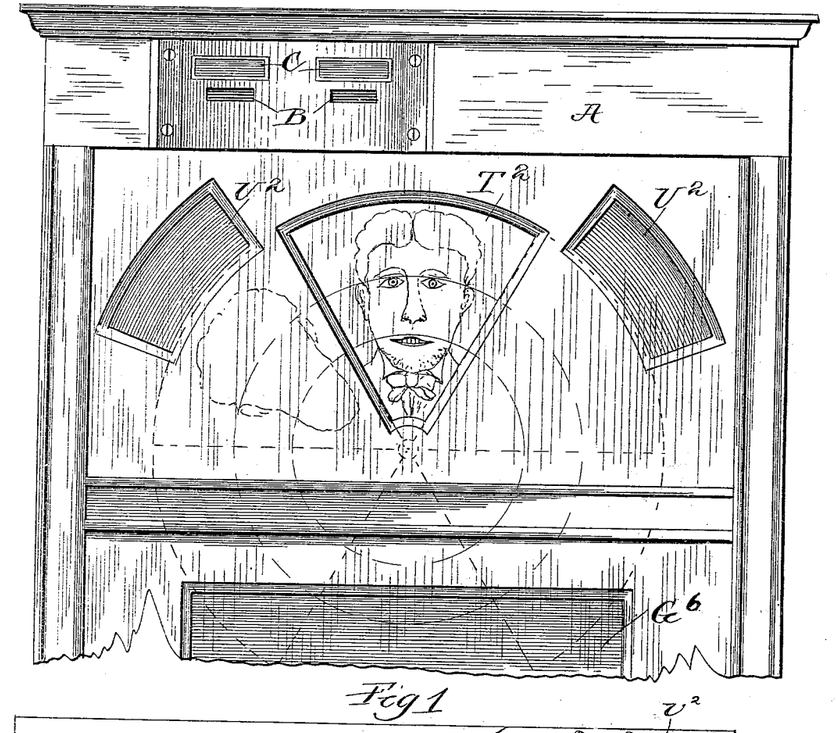
Figure 1 is a front elevation of the upper portion of a casing containing my invention and showing one form of the display device.
Figure 2:
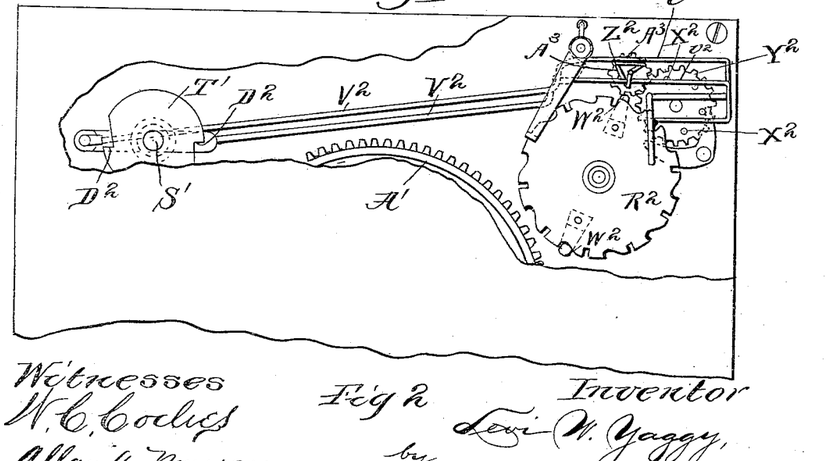
Fig. 2 is a detail illustrating a portion of the device for changing the motor-driven display-disks.
Figures 8, 10:
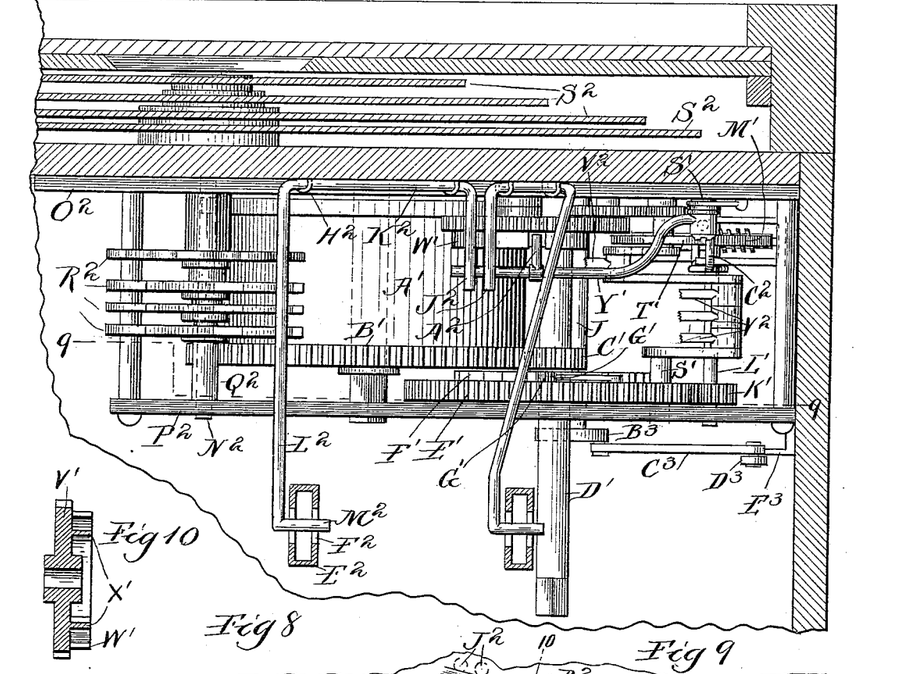
Fig. 8 is a plan view, on an enlarged scale, in section, on the line 8 8 of Fig. 3 and with some of the parts omitted or broken away.
Fig. 10 is a sectional detail on the line 10 10 of Fig. 9.
Figure 9:
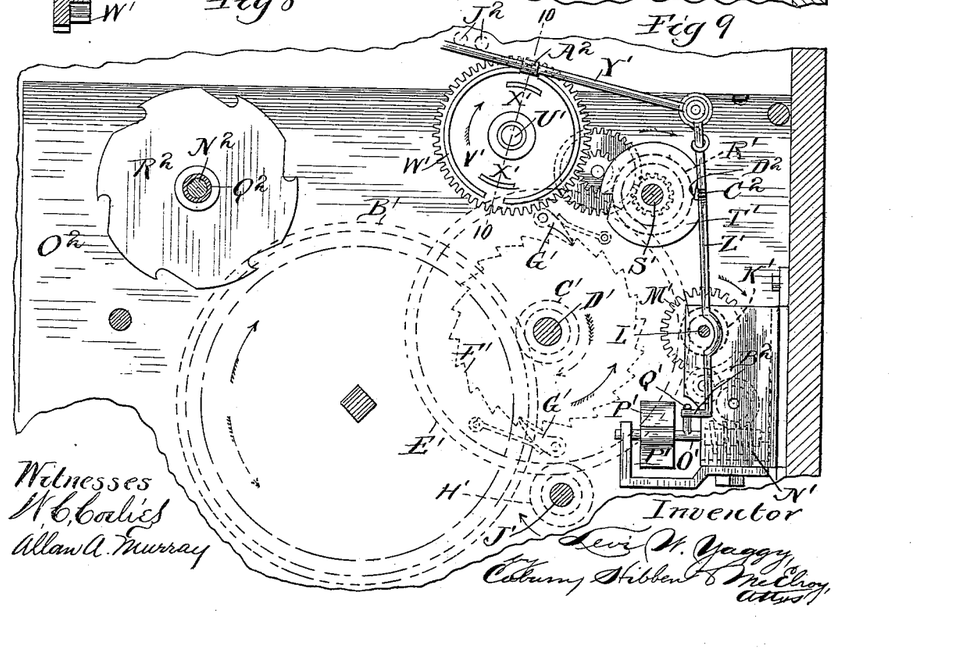
Fig. 9 is a rear elevation of the mechanism shown in Fig. 8 in section on the line 9 9 thereof.

Referring now especially to Figs. 1, 2, 6, 8, and 9, I will describe briefly the display mechanism. A rod $N^2$, extending from the front plate $O^2$ to the rear plate $P^2$ of the framework for the clockwork, has mounted thereon a series of nested hollow shafts $Q^2$, each of said shafts carrying upon its rear end a notched disk $R^2$ and upon its front end an indicating or display disk $S^2$. These disks are so mounted upon their shafts that the rearmost disk $R^2$ is connected to move with the frontmost disk $S^2$, while the rearmost disk $S^2$ is connected to move with the frontmost disk $R^2$, the intermediate disks being similarly arranged. The first three of the four disks $S^2$ have their peripheries divided into a number of sections corresponding to the number of notches in the disks $R^2$—in this instance six. The frontmost disk $S^2$, as seen in Fig. 1, has substantially its entire face covered by these corresponding portions of the same unitary design—in this instance six different mouths and chins representing different human countenances. The second disk $S^2$ has on the annular portion of its face that is not covered by the first disk $S^2$ six similar sections of human countenances, while the third disk $S^2$ similarly has six different portions, all of which may appear through the segmental aperture $T^2$. (Shown in Fig. 1.) The innermost disk $S^2$ has upon its exposed annular surface some different matter, preferably advertising matter, which is displayed through the two apertures $U^2$ (seen in Fig. 1) and which is divided into ten sections corresponding to the ten equidistant teeth of its connected disk $R^2$. It will be understood that the different portions of the different faces in these different sections of the disks are arranged to coincide exactly with each other, so that by shifting the relative positions of the disks $S^2$ very different looking individuals may be made to appear at the aperture $T^2$. For instance, the head and middle portion of the face may remain unchanged, while a rotation of the outermost disk $S^2$ will cause the chin to be changed. In order to display most effectually these different combinations of the different portions of the faces, it becomes necessary to make arrangements to rotate the disks $S^2$ intermittently, and it is preferable to arrange them so that one disk will rotate intermittently through, say, five-sixths of a complete rotation, when it will cease, and another disk will similarly rotate through five-sixths of a rotation intermittently, and the third disk will rotate similarly. By this arrangement it becomes possible to have every possible combination of the disks without any repetition whatever, which becomes important when the disks are to be used in connection with a display device of the kind herein described. To secure the intermittent rotation of these disks, I employ the same mechanism as shown in my application above described. The shaft $S'$, as seen in Fig. 8, has two oppositely-disposed eccentric portions, on one of which there is pivotally mounted an elongated drag-pawl $V^2$, the end of which coöperates with the teeth of the outermost disk $R^2$. Upon the other eccentric portions are mounted the three corresponding pawls $V^2$, which coöperate with the other disks $R^2$. The pawl $V^2$, coöperating with the outermost disk $R^2$, which is connected to the advertising-disk $S^2$, at each rotation of the shaft $S'$ moves its disk $R^2$ through an angle of thirty-six degrees. This outermost disk $R^2$ has fastened thereon two lugs $W^2$, which rotate in the plane of and contact with the pins $X^2$, projecting from the face of a disk $Y^2$, having gear-teeth upon its periphery. This disk $Y^2$ by means of its gear-teeth rotates an intermeshed disk $Z^2$, which is secured to an eccentric shaft $A^3$, extending between the plates $O^2$ and $P^2$. The three different eccentric portions of this shaft $A^3$ are at a uniform distance from the axis of the shaft and separated from each other by an angular distance of one hundred and twenty degrees, and each one of these eccentric portions coöperates with one of the three pawls $V^2$, operating the notched disks $R^2$, connected with the three outermost display-disks $S^2$. Owing to the eccentric arrangement of these sections of the shaft $A^3$ but one of the three pawls $V^2$ is permitted to drop far enough to contact with the periphery of its disk $R^2$ as the pawls are reciprocated, and it results from this construction that at each rotation of the shaft $S'$ but one of the display operating-pawls $V^2$ is brought into action. At each half-rotation of the notched disk $R^2$, connected with the rearmost or advertising disk $S^2$, one of the lugs $W^2$, coöperating with the pins $X^2$ on the disk $Y^2$, serves to shift the disk $Z^2$ through an angle of one hundred and twenty degrees, thus bringing another eccentric portion of the shaft $A^3$ in its lowermost position, so as to permit another pawl $V^2$ to operate its disk $R^2$ while removing from operative position the pawl $V^2$, which had been previously operating its disk. As will be readily seen, it results from this operation that one of the display-disks is rotated through, say, five-sixths of a complete rotation, when it stops, and another disk is similarly rotated by intermittent movements of sixty degrees at a time through another five-sixths of its rotation, when it in turn stops, and the third disk is similarly rotated. By this construction and mode of operation all of the possible combinations of the different portions of the three disks are obtained.

Figures 11, 12, 13, 14, 15, 16:
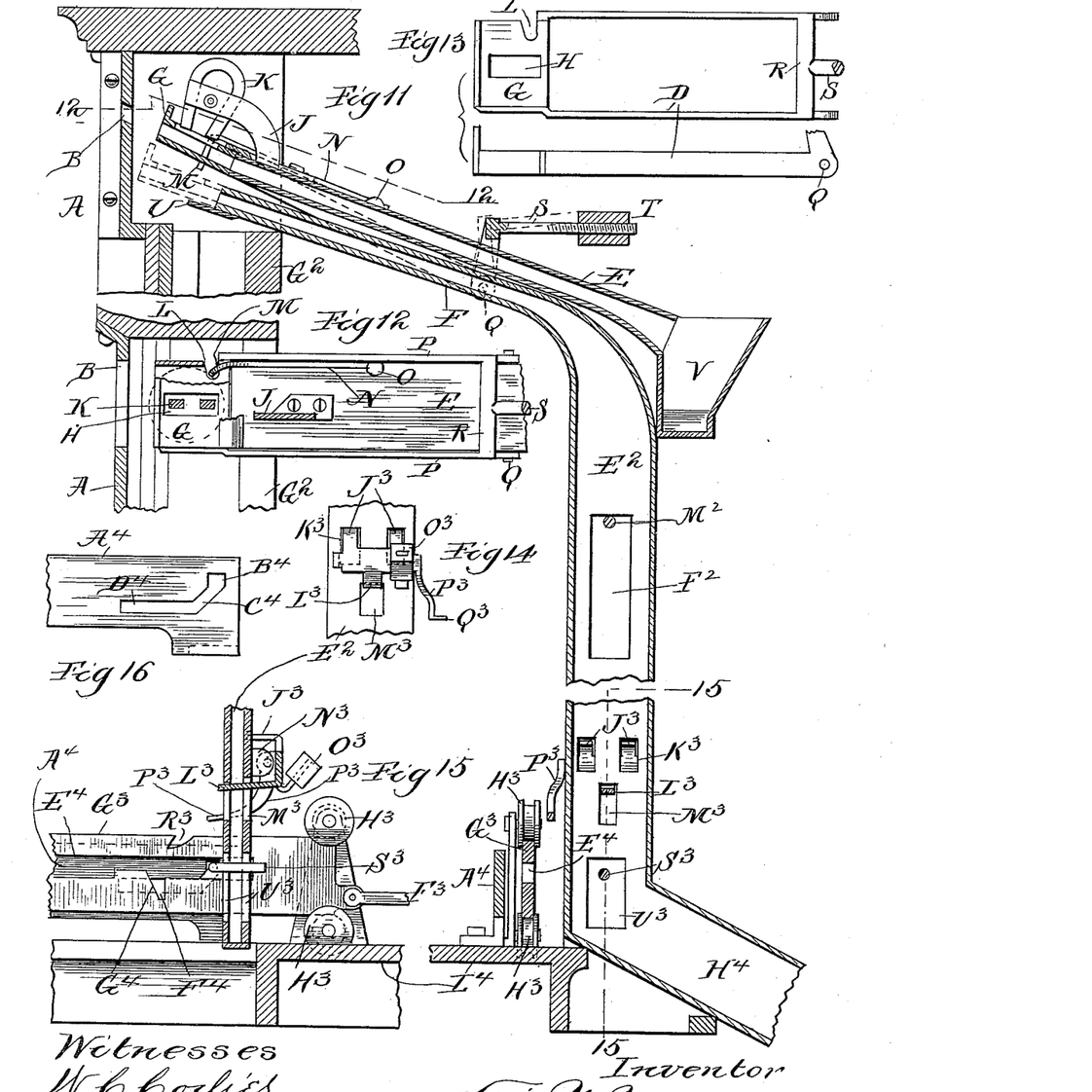
Fig. 11 is a sectional view of a portion of the coin-chutes on the line 11 11 of Fig. 3 and on an enlarged scale.
Fig. 12 is a plan view of a portion of the fraud-preventive devices in section on the line 12 12 of Fig. 11.
Fig. 13 shows a plan view and side elevation of a portion of the switch of the fraud-preventive devices.
Fig. 14 is an elevation of one of the escapement devices located in a coin-tube and employed in connection with the operation of the vending apparatus.
Fig. 15 is a sectional view of certain details of the vending apparatus on the line 15 15 of Fig. 11.
Fig. 16 is a detail of a portion of a frame containing a guide-slot.

The shaft $J'$, as seen in Fig. 3, has a disk $B^3$ upon its outer end, and this disk $B^3$ has eccentrically mounted upon it a link $C^3$, the other end of which is connected to a lever $D^3$, pivotally mounted upon a lug or projection $E^3$ upon the side of the casing. Of course it will be understood that any form of a crank connection may be substituted for the disk $B^3$ and the eccentric-pin to which the link $C^3$ is connected. The lower end of the lever $D^3$ is connected by a link $F^3$ to a plate $G^3$, which may be mounted in a set of suitably-supported antifriction-rollers $H^3$ to insure its reciprocating easily and smoothly under the operation of the shaft $J'$. It will be seen that while the clockwork is running the plate $G^3$ will be reciprocated back and forth. Referring now to Figs. 11, 14, and 15, it will be seen that I have placed in the lower end of the chute $E^2$ an escapement mechanism, which consists of the two upper prongs $J^3$, coöperating with the apertures $K^3$ in the tube $E^2$, and the longer lower prong $L^3$, coöperating with the apertures $M^3$ in the tube $E^2$. The body portion of the escapement to which these prongs are connected is pivotally mounted upon lugs $N^3$, secured to one side of the tube $E^2$, and a weight $O^3$ may be secured to the escapement mechanism to insure its being overbalanced by this lower part, so as to hang in the position shown in Fig. 15 with the prong $L^3$ in the path of a coin that may pass into the tube. Attached to one side of the escapement mechanism is another elongated prong $P^3$, which terminates in or has secured thereto a laterally-projecting lug $Q^3$, which normally rests a slight distance above the upper edge of the reciprocating plate $G^3$. When a coin after passing the end $M^2$ of the tripping-rod strikes the prong $L^3$ of the escapement, it swings the escapement down until the end $Q^3$ of the prong $P^3$ rests upon the upper surface of the reciprocating plate $G^3$, this movement of the escapement, however, not being sufficient to permit the coin to pass it completely. A notch $R^3$ is located in the upper side of the reciprocating plate $G^3$, so as to permit the end $Q^3$ of the nose $R^3$ to pass into it if said nose is depressed by the presence of a coin. The further reciprocation of the plate $G^3$ to the right causes the escapement to be moved positively to permit the coin passing it, when it will then rest upon the end $S^3$ of the wire or rod $T^3$, which end projects through slots $U^3$ in the chute $E^2$. The other end of this rod $T^3$ terminates in a sleeve $V^3$, which is mounted upon a bearing $W^3$, projecting at right angles from a sleeve $X^3$, which is fastened to or integral with a vertically-disposed rock-shaft $Y^3$. A coiled spring $Z^3$, fastened to the sleeve $X^3$, surrounding the sleeve $V^3$ and coöperating with the rod $T^3$, serves to hold the rod $T^3$ yieldingly in its uppermost position. This spring is not of sufficient capacity to prevent the weight of a coin resting on the end $S^3$ from swinging the rod $T^3$ downward about the lug $W^3$ as a pivot. Just back of the plate $G^3$ is rigidly mounted a plate $A^4$, containing a slot consisting of the vertical portion $B^4$, the inclined portion $C^4$, and the horizontal portion $D^4$. The rod $T^3$ passes through this slot in the plate $A^4$. The reciprocating plate $G^3$ contains a longitudinal slot $E^4$, through which the rod $T^3$ also passes, and this slot also has in its under side the notch $F^4$, which has an inclined side $G^4$.

All of the mechanism just described is in the apparatus shown in duplicate, except the reciprocating plate $G^3$, which, however, has the two notches $R^3$ to coöperate with the two detents $P^3$, and the longitudinal slot $E^4$ in said plate extends substantially throughout its length and has the two notches $F^4$ to coöperate with the two rods $T^3$. Of course it would be possible to have duplicate motors, each operating on the display device and duplicate slides $G^3$; but I prefer the construction where the single motor and slide are arranged to operate a plurality of delivery mechanisms.

The operation of the mechanism just described is as follows: After the coin has passed down the chute $E^2$ and thereby started the motor mechanism it falls until it rests on the prong $L^3$, having swung the escapement down until the lug $Q^3$ rests upon the upper edge of the plate $G^3$, which is now reciprocating owing to its described connections to the motor mechanism. As the plate $G^3$ moves to the right from the position shown in Fig. 15 its notch $R^3$, coöperating with the lug $Q^3$ of the prong $P^3$, rocks the escapement still further until the coin passes the prong $L^3$ and rests upon the end $S^3$ of the rod $T^3$, having moved the end $S^3$ down until the rod $T^3$ rests upon the edge of the slot $E^4$, where it remains until the notch $F^4$ comes beneath the rod $T^3$, when it is permitted, under the weight of the coin, to drop into said notch, where it is still held by the weight of the coin. At this time the movement of the plate $G^3$ to the right has ceased and it begins to move to the left and carries with it the rod $T^3$, which is held down by the weight of the coin until the end $S^3$ is swung to the left so far as to move out of the slots $U^3$, at which time the coin escapes and runs down the inclined section $H^4$ of the coin-chute and is discharged into the common chute $J^4$. (Shown in Figs. 4 and 5.) When the rod $T^3$ releases the coin, it is still held down, because its end has been swung so far to the left that it has entered the horizontal portion $D^4$ of the slot in the guide-plate $A^4$, and the rod $T^3$ is moved to the left until it reaches the end of the horizontal portion $D^4$ of the slot, when the direction of movement of the plate $G^3$ is changed and the rod $T^3$ is returned to its normal position, coming up under the stress of the spring $Z^3$ when it reaches the inclined portion $C^4$ of the slot in the guide-plate $A^4$, which inclined portion also aids in raising it up. If this means should fail to raise it up to the required height, the inclined portion $G^4$ of the notch $F^4$ will certainly cam it up to its highest and normal position, where it is ready to receive and be acted upon by another coin.

Figure 4:
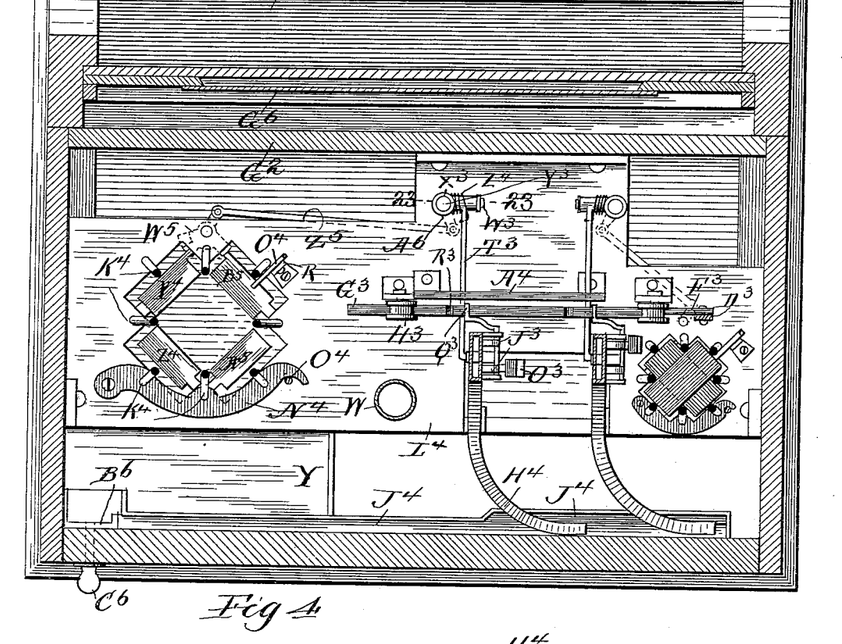
Fig. 4 is a plan view in section on the line 4 4 of Fig. 3.
Figure 5:
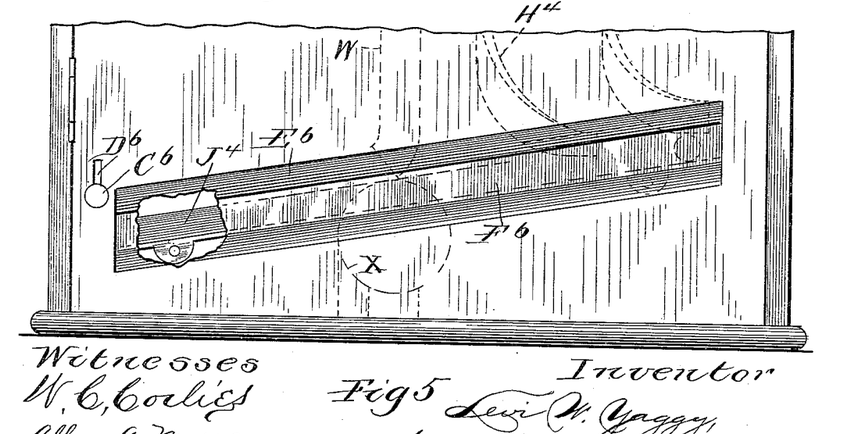
Fig. 5 is a rear elevation of the lower portion of the casing, showing the coin-display chute.
Figures 6, 7, 25:
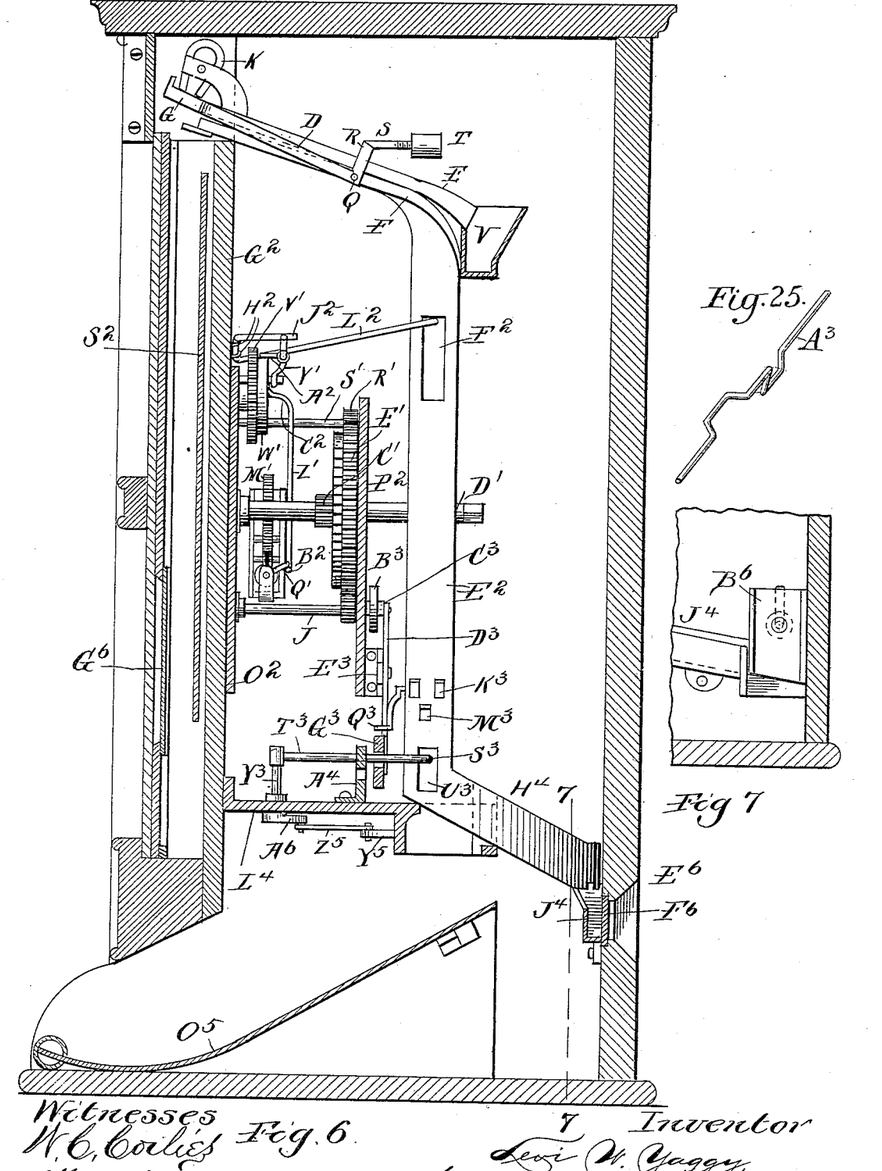
Fig. 6 is a sectional view on the line 6 6 of Fig. 3.
Fig. 7 is a detail view of one of the inner rear corners of the casing, showing a stop to be operated in connection with the coin-display chute shown in Fig. 5.
Fig. 25 is a perspective view of the shaft $A^3$, showing its eccentric portions.
Figures 17, 18, 19, 20, 21, 22, 23, 24:
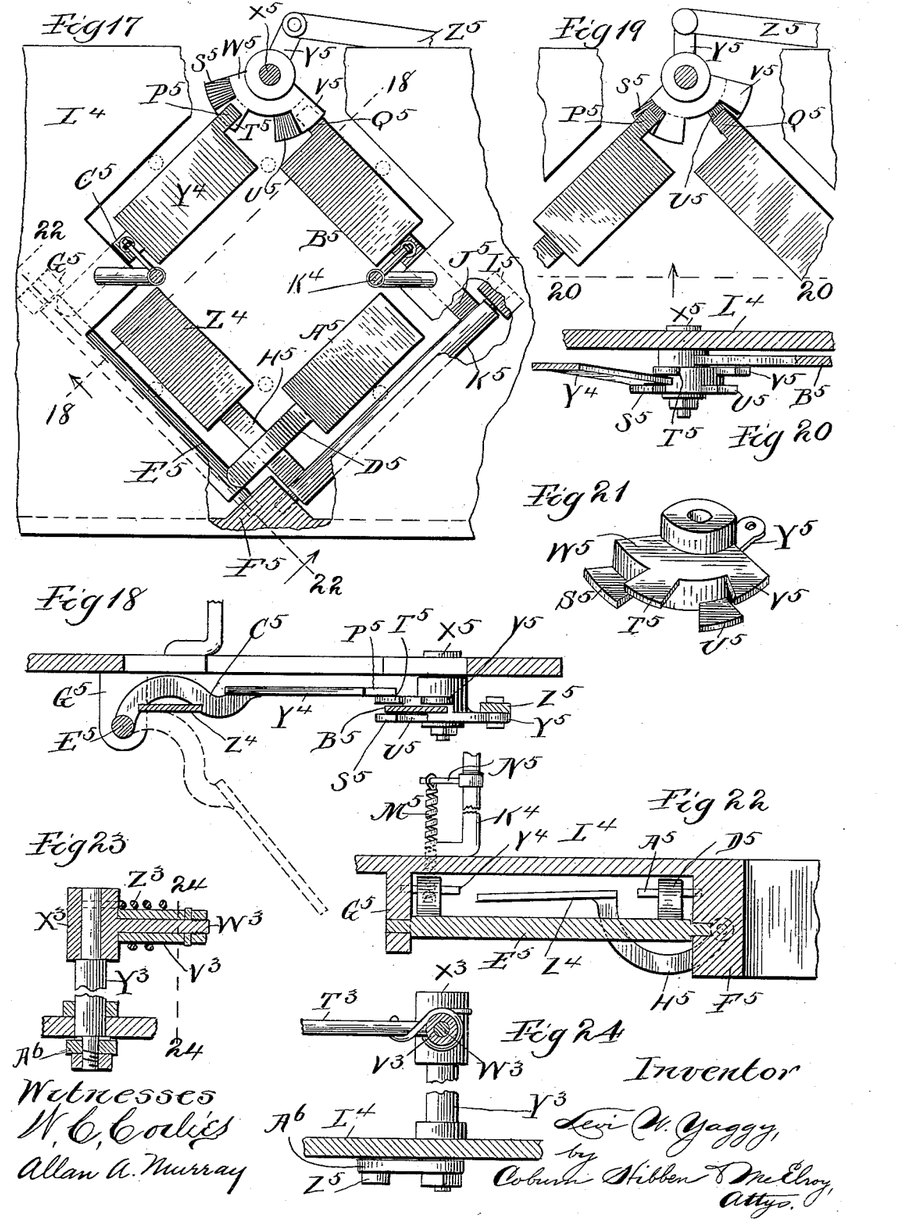
Fig. 17 is a plan view of a portion of the package-delivery apparatus, some of the parts being broken away and in section to more clearly illustrate the construction.
Fig. 18 is a sectional view of the same apparatus on the line 18 18 of Fig. 17.
Fig. 19 is a view similar to Fig. 17, showing a portion of the same mechanism in a different position.
Fig. 20 is a sectional view of the mechanism shown in Fig. 19 on the line 20 20 thereof.
Fig. 21 is a perspective view of the reciprocating controlling-piece employed in connection with the package-delivery mechanism.
Fig. 22 is a sectional view on the line 22 22 of Fig. 17.
Fig. 23 is a sectional detail of the mechanism on the line 23 23 of Fig. 4.
Fig. 24 is an elevation of the same detail on the line 24 24 of Fig. 23.

Considering now the vending mechanism proper, which is best shown in Figs. 3, 4, and 17 to 24, I employ for holding the packages of gum, candy, or whatever commodity may be sold thereby the series of parallel rods $K^4$, which are placed between the horizontal partition $L^4$ and the top of the casing or a supplemental partition, such as $M^4$. (Shown in Fig. 3.) These wires extend between these partitions and preferably consist of eight wires arranged, as best shown in Fig. 4, so that the packages of gum, &c., may be laid therein diagonally, as seen at the right-hand side of Fig. 4, and every alternate package at an angle of ninety degrees to the adjacent packages. For convenience in filling the skeleton guideways thus formed I mount the three rear wires in each set in pivoted frames, the lower ones $N^4$ being pivotally mounted upon the upper side of the partition $L^4$ and having a removable pin $O^4$ to hold them in place, while the upper ones $P^4$ are pivoted to the under side of the partition $N^4$ and may be provided with pins to hold them in place; but such pins are not absolutely necessary, as in the lower frame. Of course it will be understood that I may employ a continuous receptacle instead of the skeleton one, in which case it would be substantially of the shape formed by the crossed packages. To prevent the insertion of a coin when the supply of any commodity is exhausted, I pivot a dog $Q^4$, of the shape best shown in Fig. 3, in a lug or bearing $R^4$ and connect the upper end of said lug by a link $S^4$ to a bell-crank lever $T^4$, pivoted to the framework in the upper part of the casing. The other end of this bell-crank lever $T^4$ has pivoted thereto a link $U^4$, which is connected at its other end to a slide $V^4$, operating in ways $W^4$ just behind the aperture B. The angles at which the dogs $Q^4$ and the bell-crank $T^4$ are pivoted are such that as the lower end of the dog $Q^4$, which projects into space normally filled by the lowermost packages, is held back by said packages when present, it rocks the bell-crank lever $T^4$, so as to draw the slide $V^4$ from in front of the aperture B and thus permit the insertion of the coin. When the supply of material is exhausted, the spring $X^4$, which is connected to the casing and the bell-crank $T^4$, draws the bell-crank down, so as to move the slide $V^4$ over the aperture B, and thus prevent the insertion of any more coins in that particular aperture. The packages are supported by the plates $Y^4$, $Z^4$, $A^5$, and $B^5$, which are pivotally mounted in the manner to be described. The plates $Y^4$ and $A^5$ are connected by arms $C^5$ and $D^5$, respectively, to a rock-shaft $E^5$, which is pivoted at one end in the triangular bearing $F^5$ and at the other end in the bearing $G^5$ on the under side of the partition $L^4$. The plates $Z^4$ and $B^5$ are respectively connected by the arms $H^5$ and $J^5$ to the rock-shaft $K^5$, which is similar to the rock-shaft $E^5$, but located at right angles thereto, and having its bearings in the lug $F^5$ and the lug $L^5$ similar to the lug $G^5$. In the operation of discharging packages these plates $Y^4$ $A^5$ and $Z^4$ $B^5$ alternately rock from their normal horizontal position, as shown in Fig. 18, to the dotted-line position thereof, so as to permit of the weight of the package discharging it. In order to permit of the rocking of these plates without interference between the arms $H^5$ and $D^5$, the arm $D^5$ is curved upwardly, while the arm $H^5$ is curved downwardly. The small coiled springs $M^5$ are conveniently fastened to the arms $N^5$, projecting from two of the rods $K^4$, and to the arms $C^5$ and $J^5$, respectively. The strength of these springs $N^5$ is sufficient to hold the plates $Y^4$ $A^5$ and $Z^4$ $B^5$ in their horizontal position, unless a package is resting thereon and the plates are unsupported by anything else, under which circumstances the plates will rock down under the weight of the package and allow it to slide off the plates and be discharged into the curved receptacle $O^5$, of the shape best shown in section in Fig. 6. To provide for holding these plates $Z^4$ $B^5$ and $Y^4$ $A^5$ up, except when a package is to be discharged, I employ the projections $P^5$ and $Q^5$ on the ends of said plates, which coöperate with the projections $S^5$, $T^5$, $U^5$, and $V^5$, which project radially from the rocking controlling-piece $W^5$, which is mounted upon a stub-shaft $X^5$, carried by and projecting from the under side of the partition $L^4$. This controlling-piece $W^5$ is connected, by reason of the arm $Y^5$ thereon and the link $Z^5$, to the arm $A^6$, projecting from the lower end of the rock-shaft $Y^3$, which has been previously described. It will be remembered that this rock-shaft $Y^3$ is oscillated by the motor mechanism whenever a coin has been passed through its coöperating chute $E^2$. The operation of this mechanism is as follows: Supposing the parts to be in the position shown in Fig. 17, the lowermost package will be resting upon the plates $Y^4$ and $A^5$, and the plates $Z^4$ and $B^5$ will not be subjected to any pressure and will be held up, by reason of the spring $M^5$, with its lug $Q^5$, resting against the under side of the lug $V^5$. The plates $Y^4$ and $A^5$, which contain the lowermost package, are held up against the weight of the packages by reason of the lug $P^5$, resting upon the upper surface of the lug $T^5$. As the arm $Y^5$ is rocked from the right over to the left by the movement of the shaft $Y^3$ the controlling-piece $W^5$ takes the position shown in Fig. 19, where the lug $P^5$ has dropped down upon the upper surface of the lug $S^5$ by reason of the weight of the package resting upon the plates $Y^4$ and $A^5$. The lug $Q^5$ is released from the under side of the lug $V^5$, and by reason of the pull of the spring $M^5$ is carried up as far as the next to the lowermost package of the pile will permit it to ascend. The controlling-piece then shifts back to the position of Fig. 17, and when this shift has been completed the positions of the various lugs under consideration are as follows: The lug $P^5$ is released from the upper surface of the lug $S^5$ and passes beneath the lug $T^5$; but owing to its being unsupported the weight of the package rocks the plates $Y^4$ and $A^5$ into the dotted-line position of Fig. 18, thus discharging the package. As soon as the package is discharged the spring $M^5$ brings the plates to their horizontal position, with the lug $P^5$ pressing up against the under side of the lug $T^5$. At the same time the lug $V^5$ has passed under the lug $Q^5$, which now receives the weight of a package owing to the discharge of the package upon the plates $Y^4$ and $A^5$. The controlling-piece $W^5$ then remains stationary until another coin is inserted, when its movement will be repeated, but with the result that a package will be discharged by reason of the dropping of the plates $Z^4$ and $B^5$, as will be readily apparent. By the construction which I employ the operation of the device is not hampered in the least by the weight of the pile of packages to be delivered, and it works with equal facility whether the device is full or almost empty and also irrespective of the weight of the packages. Moreover, it will be observed that the weight of the packages really operates the discharging mechanism and that the motor mechanism simply acts as a controlling agent.

I have shown the machine arranged for two different commodities, but have described it as if but one were present, as the operation of the parts is the same whether one or a dozen slots and different kinds of commodities are present.

The labels C show which aperture B should be used to obtain the particular article desired. As seen in Fig. 8, no matter through which chute $E^2$ the coin passes the motor will be actuated by reason of the coin coöperating with the portion $M^2$ of one of the tripping-rods, depending upon which chute is employed. The motor being set in operation, when the coin reaches the detent mechanism $J^3$ to $P^3$, which mechanism is the same in both chutes, the right-hand or left-hand rod $T^3$ will be rocked, and thereby the motor coupled to the right-hand or left-hand delivery mechanism, as the case may be. Of course it will be understood that only the delivery mechanism corresponding to the aperture in which the coin is placed will be operated, although both delivery mechanisms might be operated simultaneously if two coins were inserted in the slots simultaneously or substantially so.

The operative coins, as before stated, are discharged into the chute $J^4$, and if it is desired upon the insertion of a coin which the proprietor has reason to believe is spurious, but will operate the machine, to examine said coin he immediately pulls down the slide $B^6$, (shown in Fig. 7,) which is located so as to close the end of the chute $J^4$ and is operated by the knob $C^6$, projecting out through the slot $D^6$. When this slide is down, the coins will collect in the trough $J^4$, and in order to permit of their inspection without opening the door constituting the back of the casing, which might cause suspicion, I make a slot $E^6$ therein, preferably having beveled edges along the line of the trough $J^4$, and place a sheet of glass $F^6$ back of the slot through which the coin or coins may be examined.

Upon the lower portion of the front of the casing I preferably make an aperture $G^6$, in which some advertising matter may be inserted by the proprietor of the place where the machine is located.

While I have shown my invention as embodied in the form which I at present consider best adapted for practical use, it will be understood that the invention is capable of many modifications and that I do not desire to be limited to the exact form shown and described; but

What I claim, and desire to secure by Letters Patent of the United States, is—

1. In a coin-controlled apparatus, the combination of a display device, with a vending apparatus, motor mechanism for operating said display device and vending apparatus, and coin-controlled apparatus for first setting said display device in operation and subsequently connecting the vending apparatus to the motor mechanism to be operated thereby, substantially as described.

2. In a coin-controlled apparatus, the combination of a display device, with a vending apparatus, motor mechanism for operating said display device and vending apparatus, and coin-controlled apparatus comprising a trip for setting the motor mechanism in operation to actuate the display device and another trip for connecting said motor mechanism and vending apparatus for operation.

3. In a coin-controlled display device, a series of indicating members capable of different combinations, with motor mechanism for varying said combinations regularly and in a predetermined manner, and coin-controlled mechanism for setting the motor in operation, substantially as described.

4. In a coin-controlled display device, a series of indicating members carrying fractional indications capable of different combinations, motor mechanism for moving said members and systematically varying the combinations throughout the entire range, and coin-controlled mechanism for controlling the movement of said motor.

5. In a coin-controlled display device, a series of indicating members carrying fractional indications capable of different unitary combinations, with motor mechanism for automatically varying said combinations, and coin-controlled mechanism for controlling the movement of said motor.

6. In a coin-controlled display device, indicating mechanism capable of displaying a variety of indications, means for moving said mechanism to vary the indications regularly and in a predetermined manner through all possible combinations and coin-controlled mechanism for controlling the movement of said indicating mechanism.

7. In a coin-controlled display device, an indicating mechanism capable of displaying a variety of indications, with motor mechanism for automatically varying the indications regularly and in a predetermined manner, and coin-controlled mechanism for controlling the movement of the motor.

8. In a coin-controlled display device, an indicating mechanism comprising a plurality of indicating members carrying fractional indications whereby it is capable of displaying a variety of indications, means for moving said mechanism to vary the indications regularly and in a predetermined manner with vending apparatus, and coin-controlled mechanism for controlling the movement of said indicating mechanism and the operation of said vending apparatus.

9. In a coin-controlled apparatus, the combination with a chute through which good coins are adapted to pass, of a chute for spurious coins located above said good-coin chute, an oscillatory switch-piece adapted to receive a coin inserted in the apparatus and to discharge it into the upper end of either of said chutes, and a detent stationary relative to said switch-piece and adapted to prevent the entrance of a coin into said spurious-coin chute when the switch-piece is in register therewith until said coin is forced past the detent.

10. In a coin-controlled apparatus, the combination with a chute through which good coins are adapted to pass, of a chute for spurious coins located above said good-coin chute, an oscillatory switch-piece adapted to receive a coin inserted into the apparatus and to discharge it into the upper end of either of said chutes, and a magnet located above said switch-piece and adapted to prevent the passage of a magnetic disk therethrough until it is forced past the magnet.

11. In a coin-controlled apparatus, the combination with a chute through which good coins are adapted to pass, of a chute for spurious coins located above said good-coin chute, an oscillatory switch-piece adapted to receive a coin inserted into the apparatus and to discharge it into the upper end of either of said chutes, a detent stationary relative to said switch-piece, and a magnet located above said switch-piece, said detent and magnet adapted to prevent the passage of a spurious coin into either of the chutes until it has been forced through the switch-piece and past the detent and magnet into the spurious-coin chute.

12. In a coin-controlled apparatus, the combination with a pair of chutes, of an oscillatory switch-piece adapted to receive a coin inserted into the apparatus and to discharge it into the upper end of either of said chutes, and a detent stationary relative to said switch-piece and adapted to prevent the entrance of a coin into the obstructed one of said chutes until it has been forced through the switch-piece by the insertion of another coin.

13. In a coin-controlled apparatus, the combination with a pair of chutes, of an oscillatory switch-piece adapted to receive a coin inserted into the apparatus and to discharge it into the upper end of either of said chutes, and a magnet located adjacent to one position of the switch-piece and adapted to prevent the entrance of a magnetic disk or token into one of said chutes under any circumstances, and also to prevent its passage into the other chute except after it has been forced through the switch-piece by the insertion of another coin or token.

14. In a coin-controlled apparatus, the combination with a pair of chutes, of an oscillatory switch-piece adapted to receive a coin inserted into the apparatus and to discharge it into the upper end of either of said chutes, a magnet located adjacent to one position of the switch-piece, and a detent also coöperating with said switch-piece in the same position, said magnet and said detent operating to prevent the passage of a magnetic disk or token into said chutes until it has been forced through the switch-piece by the insertion of another coin.

15. In a coin-controlled apparatus, the combination of a casing having a coin-aperture, with a magnet located inside of the casing and adjacent to the aperture and adapted to retain a magnetic disk adjacent thereto until it is forced away by contact with a subsequently-inserted disk.

16. In a coin-controlled apparatus, the combination of a plurality of chutes located one above the other, with a switch-piece corresponding to and adapted to form a continuation of any of said chutes and normally located in proximity to an upper chute and adapted to discharge a coin therein if the coin is light weight, and a magnet suitably located relative to the switch to attract a magnetic disk therein and to prevent its discharge except into said upper chute.

17. In a coin-controlled apparatus, the combination of a plurality of chutes, with a switch-piece normally located in proximity to one of said chutes and adapted to discharge a coin therein, with a detent stationary relative to said switch-piece and coöperating therewith in its normal position only.

18. In a coin-controlled apparatus, the combination of a plurality of chutes, with a switch-piece normally located in proximity to one of said chutes and adapted to discharge a coin therein, and a detent in connection with said switch-piece and stationary relative thereto to prevent the discharge of a coin therethrough when the switch-piece is in its normal position, but releasing the coin when the switch-piece is in register with another chute.

19. In a coin-controlled apparatus, the combination of a plurality of chutes, with a switch-piece normally located in proximity to one of said chutes and adapted to discharge a coin therein, and a yielding detent coöperating with said switch-piece in one position, but not in another.

20. In a coin-controlled mechanism, the combination of the inclined chutes E and F, in which coins are adapted to slide one disposed above the other, with the switch-piece pivotally mounted in relation thereto, and having its body portion adapted to form a continuation of either of said chutes, an adjustable weight on said switch-piece for balancing it to determine what weight of coin shall be discharged in either chute, and a detent stationary relative to and coöperating with the chute E to prevent the passage of a coin while the switch-piece is in register therewith until the coin is forced past the detent.

21. In a coin-controlled apparatus, the combination of the inclined chutes E and F located one above the other, with a switch-piece pivotally mounted in connection therewith and having its body portion adapted to form a continuation of either chute, and the spring-detent M projecting into said body-piece when it is in register with the chute E, substantially as and for the purpose described.

22. In a coin-controlled apparatus, the combination of the inclined chutes E and F in which coins are adapted to slide, with the switch-piece pivotally mounted in connection therewith and having its body portion adapted to form a continuation of either of said chutes, and the magnet K suitably located in connection with said switch-piece to prevent the passage of a magnetic disk attracted thereby until it has been forced into the chute E, substantially as and for the purpose described.

23. In a coin-controlled delivery apparatus, a plurality of delivery mechanisms, a motor for operating the same, connections between said motor and delivery mechanisms, and coin-controlled mechanism for selecting the delivery mechanism to be operated and automatically operating the connections between the motor and said delivery mechanism.

24. In a coin-controlled apparatus, the combination with a motor, of a plurality of delivery mechanisms adapted to be connected to said motor, a plurality of apertures, one for each delivery mechanism, to determine by a coin inserted therein which of the delivery mechanisms shall be connected to said motor for operation, and connections between said motor and delivery mechanisms automatically operated by the insertion of a coin.

25. In a coin-controlled apparatus, the combination with a motor, of a plurality of delivery mechanisms adapted to be connected to said motor, a plurality of apertures and associated coin-chutes, one for each delivery mechanism, and connecting mechanism between each delivery mechanism and the motor operated by the passage of a coin through the chute.

26. In a coin-controlled apparatus, the combination with a motor, of a plurality of delivery mechanisms adapted to be connected to said motor, a plurality of apertures and associated coin-chutes, one for each delivery mechanism, connecting mechanism between each delivery mechanism and the motor, and trips controlling said connecting mechanisms extending into the respective chutes.

27. In a coin-controlled delivery apparatus, a motor mechanism set in operation by the coin, an automatic delivery mechanism capable of operation by the motor mechanism, and connections between said motor and delivery mechanisms also controlled by the coin, substantially as described.

28. In a coin-controlled delivery apparatus, a motor mechanism set in operation by the coin, a plurality of automatic delivery mechanisms capable of operation by the motor mechanism, and connections between said motor and delivery mechanisms also controlled by the coin, which also selects the delivery mechanism to be operated.

29. In a coin-controlled delivery apparatus, a motor mechanism set in operation by the coin, a plurality of delivery mechanisms capable of operation by the motor mechanism, a plurality of coin-chutes, and connections between said motor and delivery mechanisms so arranged that a coin passing through any chute sets the motor mechanism in operation and connects thereto the delivery mechanism corresponding to its chute.

30. In a coin-controlled delivery apparatus, a motor mechanism set in operation by the coin, a delivery mechanism capable of operation by the motor mechanism, and connections between said motor and delivery mechanisms including the reciprocating member $G^3$, and a coin-set escapement operated by said reciprocating member to release the coin, substantially as described.

31. In a coin-controlled delivery apparatus, a motor mechanism set in operation by the coin, a delivery mechanism capable of operation by the motor mechanism, and connections between said motor and delivery mechanisms including the reciprocating member $G^3$, a coin-set escapement operated by said reciprocating member to release the coin, and a rod $T^3$ also set by the coin and when so set operated by the reciprocating member $G^3$.

32. In a coin-controlled apparatus, the chute $E^2$, the escapement therein, the reciprocating member $G^3$ coöperating with said escapement, the wire $T^3$ also projecting into the chute beyond the escapement, and connections operated by the movement of the wire caused by the weight of the coin to connect it to the member $G^3$.

33. In a coin-controlled apparatus, the chute $E^2$, the escapement located therein and having the projection $Q^3$ thereon, with the member $G^3$ reciprocating beneath said escapement and having the notch $R^3$ coöperating with the lug $Q^3$, the wire $T^3$ projecting through a slot in the member $G^3$ and into the tube $E^2$, and a notch $F^4$ in said member $G^3$ coöperating with the wire $T^3$, substantially as and for the purpose described.

34. In a delivery device, the combination with the receptacle adapted to receive the packages in such manner as to cause the adjacent packages to overlap, of multiple delivery mechanisms mounted at different sides of said receptacles and in their retaining position having their upper surface horizontal to sustain their respective packages and in their discharge position inclined to permit the packages to slide off, and coin-controlled mechanism for operating said delivery mechanisms singly.

35. In a delivery device, the combination with the receptacle adapted to receive the packages in such manner as to cause adjacent packages to overlap, of two or more delivery mechanisms each pivotally mounted at one side thereof at different sides of said receptacles and in their retaining position having their upper surface horizontal to sustain their respective packages and in their discharge position inclined to permit the packages to slide off, and coin-controlled mechanism for operating said delivery mechanisms singly.

36. In a vending apparatus, a delivery mechanism moving to deliver the article, an unyielding support for positively holding the delivery mechanism in an article-retaining position, a yielding support for holding it in said position which is supplemental to the unyielding support but which is overcome by the weight of the single article, and coin-controlled mechanism for withdrawing the positive support, substantially as described.

37. In a delivery device, the plates $Y^4$ and $A^5$ mounted upon a rock-shaft, with the plates $Z^4$ and $B^5$ similarly mounted and at right angles thereto, the controlling-piece $W^5$ coöperating with said plates and coin-controlled mechanism for operating said controlling-piece, substantially as and for the purposes described.

38. In a delivery device, the plates $Y^4$ and $A^5$ mounted upon a rock-shaft, with the plates $Z^4$ and $B^5$ similarly mounted and at right angles thereto, the springs $M^5$ connected to the said plates substantially as described, the controlling-piece $W^5$ coöperating with said plates and coin-controlled mechanism for operating said controlling-piece, substantially as and for the purposes described.

39. In a delivery device, the plates $Y^4$ and $A^5$ mounted upon a rock-shaft, with the plates $Z^4$ and $B^5$ similarly mounted and at right angles thereto, the springs $M^5$ coöperating with said plates, the controlling-piece $W^5$ having the lugs $S^5$, $T^5$, $U^5$ and $V^5$ coöperating with the plates $Y^4$ and $B^5$ and coin-controlled mechanism for operating said controlling-piece, substantially as described.

40. In a delivery device, the plates $Y^4$ and $A^5$ mounted upon a rock-shaft, the plate $A^5$ having the curved arm $D^5$, with the plates $Z^4$ and $B^5$ similarly mounted and at right angles thereto, the plate $Z^4$ having the curved arm $H^5$, the controlling-piece $W^5$ coöperating with the plates $Y^4$ and $B^5$ and coin-controlled mechanism for operating said controlling-piece, substantially as and for the purpose described.

41. In a coin-controlled apparatus, the combination of a receptacle for articles to be delivered, with a delivery mechanism located at the lower end thereof upon which the lowermost article rests, means for supporting all but the lowermost article, a positive support for said mechanism, a yielding support for said mechanism overcome by the weight of a single article, and coin-controlled mechanism for withdrawing said positive support from the delivery mechanism.

42. In a coin-controlled apparatus, the combination of a receptacle for articles to be delivered, with a delivery mechanism located at the lower end thereof upon which the lowermost article rests, means for supporting all but the lowermost article, a positive support for said mechanism, a spring connected to said mechanism to furnish a yielding support which is overcome by the weight of a single article, and coin-controlled mechanism for withdrawing said positive support from the delivery mechanism.

43. In a coin-controlled apparatus, the combination of a receptacle for articles to be delivered, said receptacle adapted to hold the articles in overlapped position, with a plurality of delivery mechanisms located at the lower end of said receptacle, and which are adapted to alternately support the lowermost article and all of the remaining articles, a positive support for said mechanisms, yielding supports for said mechanisms adapted to be overcome by the weight of a single article, and coin-controlled mechanism for reciprocating said positive support to alternately engage one of said mechanisms while simultaneously releasing the other one.

44. In a coin-controlled apparatus, the chute $E^2$ having an aperture therein, with an L-shaped tripping-rod having the L portion projected into said aperture, said tripping-rod being pivotally mounted on a pivot oblique relative to the coin-chute so that the L end thereof swings longitudinally out of said chute.

45. In a coin-controlled apparatus, a coin-chute having an aperture therein, with a tripping-rod passing into said aperture, and a motor-driven gear-train released by the movement of said tripping-rod under the weight of the coin, said gear-train comprising the disk $V'$ having the flange $X'$ to prevent the immediate release of the coin from the tripping-rod, substantially as and for the purpose described.

46. In a coin-controlled apparatus, a coin-chute having an aperture therein, with a tripping-rod passing into said aperture, a motor-driven gear-train released by the movement of said tripping-rod under the weight of the coin, said gear-train comprising the disk $V'$ having the flange $X'$ to prevent the immediate release of the coin from the tripping-rod, and the flange $W'$ to compel the movement of the gear-train for a given time, substantially as described.

47. In a coin-controlled display device, a series of indicating members capable of different combinations, means for moving said members to vary the combinations automatically through all possible combinations, and coin-controlled mechanism which exclusively controls the operation of said means.

48. In a coin-controlled display device, a series of indicating members carrying fractional indications capable of different unitary combinations, and coin-controlled mechanism for exclusively and automatically controlling the movement of said members.

49. In a coin-controlled display device, indicating mechanism capable of displaying a variety of indications, means for operating said indicating mechanism, and coin-controlled mechanism for exclusively and automatically controlling the movement of said indicating mechanism.

50. In a coin-controlled display device, an indicating mechanism capable of displaying a variety of indications, means for moving said mechanism to vary the indications automatically, with vending apparatus, and coin-controlled mechanism for exclusively controlling the movement of said indicating mechanism and the operation of said vending apparatus.

51. In a coin-controlled display device, an indicating mechanism capable of displaying a variety of indications, with vending apparatus, a motor independently connected to said indicating mechanism and to the vending apparatus, and coin-controlled mechanism for controlling the operation of said motor.

LEVI W. YAGGY.

Witnesses:
CHARLES M. CORMACK,
ALBERT B. ASHFORTH.